Dec. 17, 1946.  C. M. ANDERSON  2,412,706
AIR-COOLED HOISTING DRUM
Filed June 22, 1944  2 Sheets-Sheet 1

INVENTOR.
CARL M. ANDERSON
BY
Lester B. Clark.
ATTORNEY.

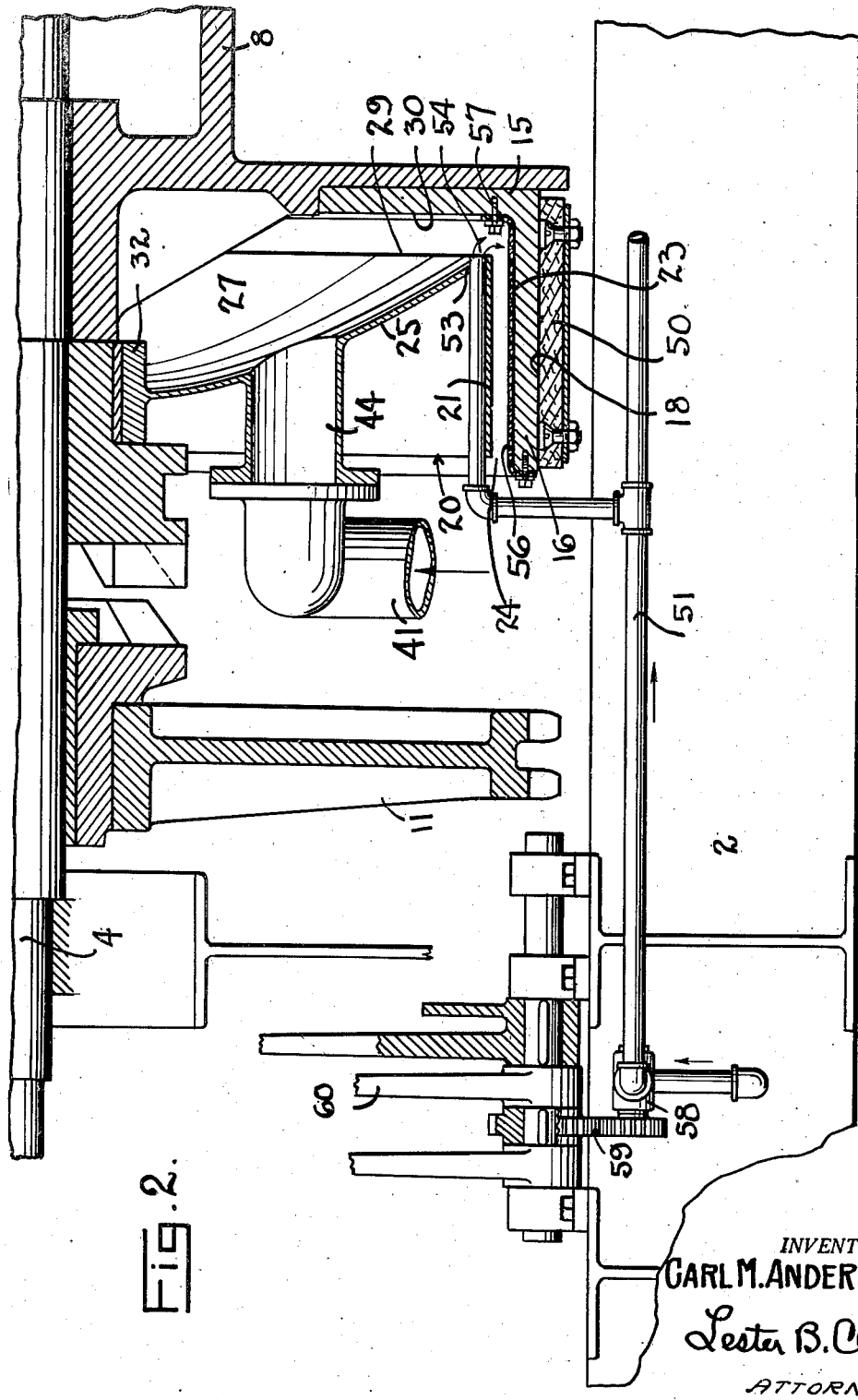

Patented Dec. 17, 1946

2,412,706

UNITED STATES PATENT OFFICE 2,412,706

AIR-COOLED HOISTING DRUM

Carl M. Anderson, Corsicana, Tex., assignor, by mesne assignments, to Bethlehem Supply Company, a corporation of Delaware Application June 22, 1944, Serial No. 541,506

7 Claims. (Cl. 188—264)

1

The invention relates to an air-cooled hoisting drum and is particularly directed to the cooling of the brake flanges on such a drum.

The invention will be described as applied to a hoisting drum such as that used in hoisting and lowering the equipment in the rotary method of drilling wells, where loads approaching 200,000 to 300,000 pounds are being controlled; but it seems obvious that it may be applied to other types of braking devices.

When a tremendous load is being handled by a hoist, the braking mechanism is subjected to tremendous stresses and a great deal of heat is necessarily developed. Various expedients have been resorted to in attempts to dissipate such heat so as to obtain as efficient operation of the braking mechanism as possible. Water-cooled brakes are well-known, but considerable difficulty is encountered due to the fact that the water must be circulated, cooled, and corrosion prevented. It is the object of the present invention to provide for the air-cooling of the brakes of a hoisting or similar piece of equipment.

Another object of the invention is to direct a flow of air against the brake drum and flange of a hoisting mechanism so as to dissipate the heat being generated due to the braking action so as to maintain the brakes at a suitable temperature.

Another object of the invention is to provide an attachment for brake drums and flanges whereby the flange may be cooled by a flow of air thereagainst.

Still another object of the invention is to provide a head adapted for attachment to a hoisting drum so as to cool the brake flanges thereof.

Still another object of the invention is to provide an air-cooling assembly for brake flanges.

It is also an object of the invention to provide an assembly where both air and water are used in combination to effect the cooling of a brake flange.

Other and further objects of the invention will be readily apparent when the following description is considered in connection with the accompanying drawings, wherein:

Fig. 2 shows a broken vertical sectional view showing one brake flange along with the brake mechanism and a control for the flow of water to the brake flange.

Figure 1:
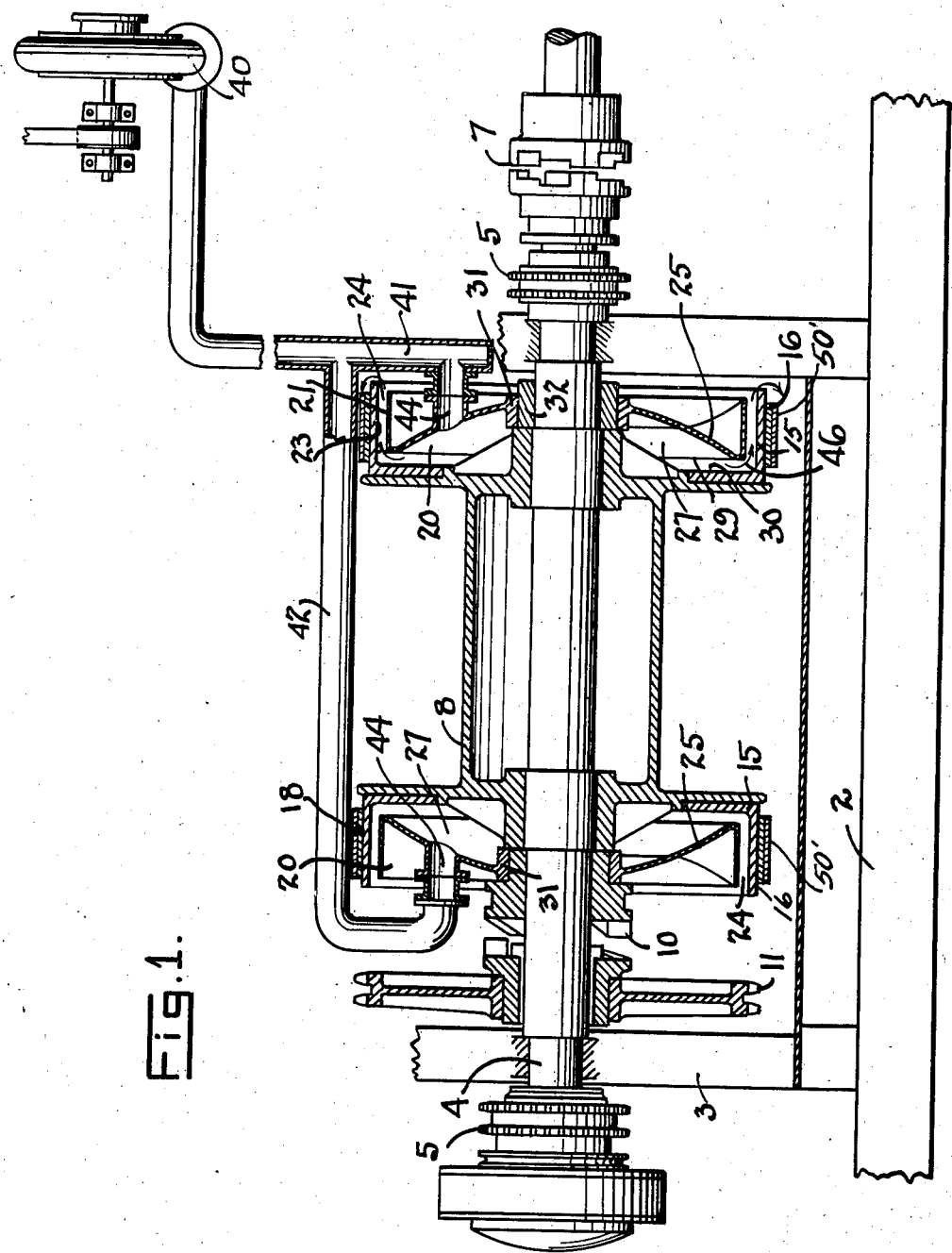
Fig. 1 is a vertical sectional view showing a hoist drum having end brake flanges, to which the invention has been applied.

In Fig. 1 the base 2 serves to support the posts 3 which carry hoist shaft 4 in suitable bearings.

2

This shaft 4 may have suitable sprocket wheels 5 thereon by which it is driven. A dental clutch 7 serves to connect the shaft to the other equipment. A hoisting drum 8 is shown as non-rotatably mounted on the shaft 4 and arranged to be driven by a dental clutch 10 and the drive wheel 11 or by a suitable sprocket.

The drum 8 is provided with the brake drums 15 arranged at either end thereof and including the brake flanges 16. These drums, of course, are fixed to the hoist drum 8 and rotate therewith, and in the usual practice the outer periphery 18 of these flanges will receive a suitable brake band 50' which is contracted to grip the flange and resist its rotation in obtaining the braking action.

The flange 16 becomes heated during the braking action, and an attachment has been provided in order to assist in cooling the flange so as to prevent burning of the brakes. This attachment is in the form of a head 20 which is circular in form and shown as having a peripheral flange 21 which is somewhat less in outer diameter than is the inside surface 23 of the brake flange 16 so as to provide an annular area or space 24 between the two concentric flanges 16 and 21.

The head 20 has a concave end 25 which is dished outwardly as seen in Fig. 1 so as to provide a chamber 27 of considerable size inside of the brake drum.

It will be noted that the inner edge 29 of the cooling head 20 is spaced a distance from the radial portion 30 of the hoist and the brake flange. This head is supported on a hub 31 fitted about the collar 32 so that the head may remain stationary as the shaft and the drum rotate.

A pump 40 is driven in any desired manner and is intended to force a stream of air through the pipe 41 to the cooling attachment on the right-hand end of the drum and also through the pipe 42 to the left-hand cooling attachment. This pump will be of a suitable capacity, but preferably capable of discharging 2,000 or 3,000 cubic feet of air a minute into the pipe 41 and 42. The pipe 41 is connected to an extension 44 forming a passage through the end portion 25 of the head 20.

With this construction a stream of air is discharged into the chamber 27 and can escape only by flowing radially outward until it reaches the inner surface of the brake flange 16, whereupon it is deflected as shown by the arrow 46 so as to flow outwardly through the annular area 24 to discharge into the atmosphere. In this manner the flange 16 will be cooled because it is continuously subjected to the flow of air under pressure which is tending to expand and absorb heat so that a substantial cooling action is obtained.

In operation the pump 40 will direct a flow of air to the cooling head so as to assist in the dissipation of the heat generated by the braking action. The cooling action is thus independent of the movement or use of the brake.

Fig. 2 is an enlarged detail of the construction already described, except that it also shows the brake band 50 as enclosing the outer periphery 18 of the flange 16.

In this form shown in Fig. 2 a pipe 51 is arranged so that it passes through an opening 53 in the end 25 of the head 20 and is arranged to discharge water at the point 54 onto the inside of the brake flange 16. This water in combination with the air being discharged into the cooling head tends to cool the brake substantially because the air tends to vaporize the water and absorb considerable heat in this manner.

To retain the water against the inside of the brake flange, a pad or layer of absorbent material 56 may be provided and suitably positioned by attaching bolts or screws 57. This absorbent material will tend to prevent the water from draining out of the brake flange immediately and serves to assist in the cooling action.

It may be likely that the addition of water may only be desirable during certain periods or certain braking operations, whereas the air may flow continuously into the brake flange if desired.

In order, therefore, to control the flow of water as a function of the use of the brake, a valve 58 is shown in the water line 51 and this valve is connected as at 59 to the brake lever 60 and may be so adjusted that when the brake lever is used the valve will be opened and discharged into the flange. On the other hand, however, the adjustment for controlling this valve 58 may be set in such a manner that the water is discharged only when the brake lever moves beyond a predetermined position.

Broadly, the invention contemplates a means and method of cooling brake flanges and dissipating the heat therefrom.

What is claimed is:

1. An air cooled brake for hoisting drums, comprising a drum having an annular brake flange fixed thereto, a supporting shaft rotatable with said drum, a brake band engaging the outer surfaces of said brake flange, a head supported relatively rotatable on said shaft and having a peripheral flange substantially parallel to the said outer surfaces of said brake flange whereby an annular passageway is formed between the inside of the said brake flange and its own outer surface, the inner face of said head being concaved to provide a distribution chamber, and means to discharge a flow of air under pressure into said head to flow out through said annular passageway in cooling the brake flange.

2. An attachment for cooling the brakes of a hoisting drum comprising a head to be disposed inside the brake flange, and means to introduce a flow of air into said head to be directed against said flange, said head having a peripheral flange spaced radially inwardly from the inner periphery of the brake flange to provide an annular outlet area for the air, and additional means to feed water thru said head to flow against the brake flange.

3. An attachment for cooling the brakes of a hoisting drum comprising a head to be disposed inside the brake flange, and means to introduce a flow of air into said head to be directed against said flange, said head having a peripheral flange spaced radially inwardly from the inner periphery of the brake flange to provide an annular outlet area for the air, additional means to feed water thru said head to flow against the brake flange, and a control valve for the water inlet which valve is connected for operation to the lever of the brake.

4. An attachment for cooling the brakes of a hoisting drum comprising a head to be disposed inside the brake flange, and means to introduce a flow of air into said head to be directed against said flange, said head having a peripheral flange spaced radially inwardly from the inner periphery of the brake flange to provide an annular outlet area for the air, additional means to feed water thru said head to flow against the brake flange, and means inside the brake flange to retain water.

5. An air cooling head for hoist drum brakes comprising an annular flange, a concave head joining said flange, a hub in said head so as to support the head on the hoist drum shaft, and means to connect an air inlet conduit to said head portion.

6. An air cooling attachment for hoist drum brakes including a member to be disposed inside the brake flange, a curved face thereon to direct air against the brake flange, and means to force air thru said member to discharge against the flange.

7. An air cooling attachment for hoist drum brakes including a member to be disposed inside the brake flange, a curved face thereon to direct air against the brake flange, and means to force air thru said member to discharge against the flange, said member being of a size to provide an annular outlet space for air between such member and the inside of the brake flange.

CARL M. ANDERSON.